(12) United States Patent
Zecca et al.

(10) Patent No.: US 7,837,150 B2
(45) Date of Patent: Nov. 23, 2010

(54) ICE PROTECTION SYSTEM FOR A MULTI-SEGMENT AIRCRAFT COMPONENT

(75) Inventors: Joseph Christopher Zecca, San Diego, CA (US); Galdemir Cezar Botura, North Canton, OH (US); Brian Bobby Burkett, Akron, OH (US); Claude Marc Hubert, Riverside, CA (US); Michael John Layland, Bonita, CA (US); Timothy Robert Olson, La Jolla, CA (US); James Michael Roman, Uniontown, OH (US)

(73) Assignees: Rohr, Inc., Chula Vista, CA (US); Goodrich Corporation, Charlotte, NC (US)

( * ) Notice: Subject to any disclaimer, the term of this patent is extended or adjusted under 35 U.S.C. 154(b) by 504 days.

(21) Appl. No.: 11/963,014

(22) Filed: Dec. 21, 2007

(65) Prior Publication Data
US 2010/0038475 A1 Feb. 18, 2010

(51) Int. Cl.
B64D 15/12 (2006.01)
(52) U.S. Cl. .................................. 244/134 D
(58) Field of Classification Search ............. 244/53 B, 244/134 R, 134 D; 137/15.1; 60/39.093, 60/226.1, 796–798; 415/214.1, 215.1; 219/535
See application file for complete search history.

(56) References Cited

U.S. PATENT DOCUMENTS

| | | | |
|---|---|---|---|
| 2,339,219 A | 1/1944 | Crowley | |
| 2,496,279 A | 2/1950 | Ely et al. | |
| 2,627,012 A * | 1/1953 | Kinsella et al. | 244/134 R |
| 2,741,692 A * | 4/1956 | Luke | 219/528 |
| 2,762,897 A | 9/1956 | Vrooman | |
| 2,942,330 A * | 6/1960 | Luke | 29/611 |
| 3,178,560 A | 4/1965 | Mapp et al. | |
| 3,349,359 A | 10/1967 | Morey | |

(Continued)

FOREIGN PATENT DOCUMENTS

EP 1 845 018 A 10/2007

(Continued)

OTHER PUBLICATIONS

R.E. Evans, D.E. Hall and B.A. Iuson, Nickel Coated Graphite Fiber Conductive Composites, Sampe Quarterly, vol. 17, No. 4, Jul. 1986.

*Primary Examiner*—Timothy D Collins
*Assistant Examiner*—Michael Kreiner
(74) *Attorney, Agent, or Firm*—Womble Carlyle Sandridge & Rice, PLLC (57) ABSTRACT

An aircraft component includes a first segment having a first leading edge surface that extends to a first end of the first segment. The aircraft component also includes a second segment having a second leading edge surface that extends to a second end of the second segment. The second end is substantially adjacent to the first end of the first segment, and is connected to the first end. The first leading edge surface includes electrical resistance heating that extends to the first end of the first segment. In addition, the second leading edge surface includes electrical resistance heating that extends to the second end of the second segment. The electrical resistance heating is capable of providing ice protection heating immediately on either side of a juncture between the connected first and second ends.

21 Claims, 5 Drawing Sheets

U.S. PATENT DOCUMENTS

| | | |
|---|---|---|
| 3,604,464 A | 9/1971 | Pelley |
| 3,800,121 A | 3/1974 | Dean et al. |
| 3,935,422 A | 1/1976 | Barnes et al. |
| 4,021,008 A | 5/1977 | Eichenauer |
| 4,036,457 A | 7/1977 | Volkner et al. |
| 4,062,917 A | 12/1977 | Hill et al. |
| 4,291,079 A | 9/1981 | Hom |
| 4,473,740 A | 9/1984 | Ellis |
| 4,514,619 A | 4/1985 | Kugelman |
| 4,737,618 A | 4/1988 | Barbier et al. |
| 4,743,740 A | 5/1988 | Adee |
| 4,837,618 A | 6/1989 | Hatori et al. |
| 4,942,078 A | 7/1990 | Newman et al. |
| 4,972,197 A | 11/1990 | McCauley et al. |
| 5,192,605 A | 3/1993 | Mercuri et al. |
| 5,344,696 A | 9/1994 | Hastings et al. |
| 5,356,096 A | 10/1994 | Rauckhorst et al. |
| 5,361,183 A | 11/1994 | Wiese |
| 5,380,579 A | 1/1995 | Bianchi |
| 5,427,332 A | 6/1995 | Rauckhorst et al. |
| 5,475,204 A | 12/1995 | Giamati et al. |
| 5,584,450 A | 12/1996 | Pisarski |
| 5,653,836 A | 8/1997 | Mnich et al. |
| 5,657,951 A | 8/1997 | Giamati |
| 5,702,231 A | 12/1997 | Dougherty |
| 5,765,779 A | 6/1998 | Hancock et al. |
| 5,824,996 A | 10/1998 | Kochman et al. |
| 5,925,275 A | 7/1999 | Lawson et al. |
| 5,934,617 A | 8/1999 | Rutherford |
| 5,942,140 A | 8/1999 | Miller et al. |
| 5,947,418 A | 9/1999 | Bessiere et al. |
| 5,971,323 A | 10/1999 | Rauch et al. |
| 6,031,214 A | 2/2000 | Bost et al. |
| 6,054,690 A | 4/2000 | Petit et al. |
| 6,094,907 A | 8/2000 | Blackner |
| 6,137,083 A | 10/2000 | Bost et al. |
| 6,145,787 A | 11/2000 | Rolls |
| 6,194,685 B1 | 2/2001 | Rutherford |
| 6,330,986 B1 | 12/2001 | Rutherford et al. |
| 6,338,455 B1 | 1/2002 | Rauch et al. |
| 6,371,242 B1 | 4/2002 | Wilson et al. |
| 6,371,411 B1 | 4/2002 | Breer et al. |
| 6,403,935 B2 | 6/2002 | Kochman et al. |
| 6,457,676 B1 | 10/2002 | Breer et al. |
| 6,483,087 B2 | 11/2002 | Gardner et al. |
| 6,521,873 B1 | 2/2003 | Cheng et al. |
| 6,848,656 B2 | 2/2005 | Linton |
| 6,870,139 B2 | 3/2005 | Petrenko |
| 7,034,257 B2 | 4/2006 | Petrenko |
| 7,078,658 B2 | 7/2006 | Brunner et al. |
| 7,291,815 B2 | 11/2007 | Hubert et al. |
| 7,588,212 B2 * | 9/2009 | Moe et al. ............... 244/134 D |
| 2001/0003897 A1 | 6/2001 | Porte et al. |
| 2002/0096506 A1 | 7/2002 | Moreland et al. |
| 2002/0148929 A1 | 10/2002 | Andre et al. |
| 2003/0222077 A1 | 12/2003 | Suda et al. |
| 2003/0234248 A1 | 12/2003 | Kano et al. |
| 2004/0000615 A1 | 1/2004 | Gonidec et al. |
| 2004/0065659 A1 | 4/2004 | Tse |
| 2004/0069772 A1 | 4/2004 | Kondo et al. |
| 2004/0074899 A1 | 4/2004 | Mariner et al. |
| 2004/0129835 A1 | 7/2004 | Atkey et al. |
| 2004/0237502 A1 | 12/2004 | Moe et al. |
| 2005/0006529 A1 | 1/2005 | Moe et al. |
| 2005/0109011 A1 | 5/2005 | Courtot et al. |
| 2005/0178924 A1 | 8/2005 | Bertolotti |
| 2005/0189345 A1 | 9/2005 | Brunner et al. |
| 2006/0032983 A1 | 2/2006 | Brand et al. |

FOREIGN PATENT DOCUMENTS

| | | |
|---|---|---|
| FR | 2 898 869 | 9/2007 |
| GB | 1 247 071 A | 9/1971 |
| WO | WO 2009/085843 A3 | 7/2009 |

* cited by examiner

ICE PROTECTION SYSTEM FOR A MULTI-SEGMENT AIRCRAFT COMPONENT

FIELD OF THE INVENTION

The invention generally relates to ice protection systems for aircraft, and more particularly relates to an ice protection system for selectively heating a leading edge surface of an aircraft component, including portions of the leading edge surface that are immediately adjacent to a structural joint in the aircraft component.

BACKGROUND

Figure 1:
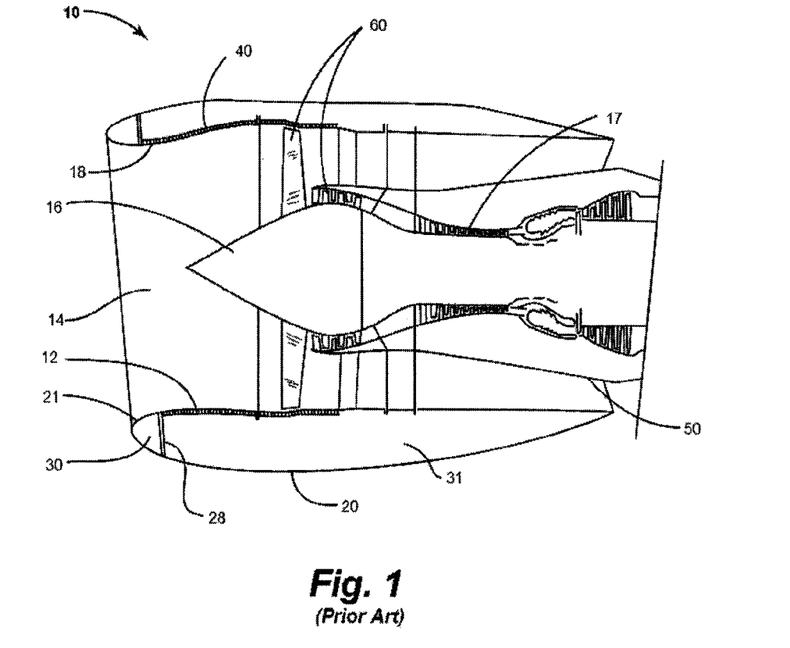
FIG. 1 is a schematic representation of a typical high-speed jet engine assembly.

The leading edges of aircraft engine nacelles and other aircraft components are prone to ice buildup. FIG. 1 shows a schematic representation of a typical high-speed jet engine assembly 10. Air enters through inlet section 14, between fan blade spinner 16 and an annular housing 18, which constitutes the forward most section of a nacelle 20, and includes nacelle inlet lip 21. Hot, high-pressure propulsion gases pass through the compressor section 17 and the exhaust assembly (not shown) at the rear of the nacelle. An annular space or D-duct 30 is defined by bulkhead 28 and annular housing 18. Bulkhead 28 separates D-duct 30 from the interior portion 31 of the inner barrel 12 of the nacelle. In flight, under certain temperature and humidity conditions, ice may form on the nacelle inlet lip 21, which is the leading edge of the annular housing 18, and on the fan blade spinner 16. Accumulated ice can change the geometry of the inlet area between annular housing 18 and fan blade spinner 16, and can adversely affect the quantity and flow path of intake air. In addition, pieces of ice may periodically break free from the nacelle 20 and/or spinner 16 and enter the engine 50, potentially damaging fan and rotor blades 60 and other internal engine components.

Figure 6:
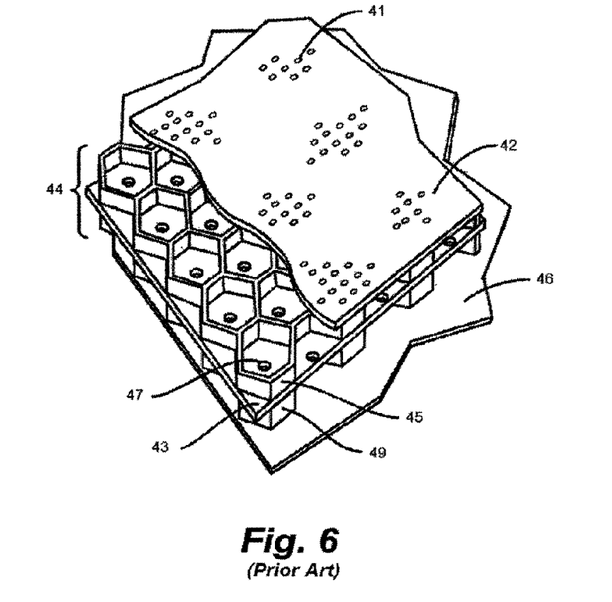
FIG. 6 is a perspective view of an acoustically treated portion of a prior art aircraft component.

Nacelles also serve an important role in addressing fan noise from the engines, which can be a prime source of overall aircraft noise. As is known to those skilled in the art, aircraft engine fan noise can be suppressed at the engine nacelle inlet 14 with a noise absorbing inner barrel liner 40, which converts acoustic energy into heat. The liner 40 normally includes (as shown in FIG. 6) a face skin 42 having a plurality of spaced openings or perforations 41. The face skin 42 is supported by an open cell core 44 to provide structural support, and to provide a required separation between the porous face sheet 42 and a solid back skin 46. The liner 40 also can include at least one septum 43 that divides each cell into sections, including an upper portion 45 and a lower portion 49. The septum 43 can include a porous membrane or a solid membrane having at least one opening 47 to provide acoustic communication between the upper cell portion 45 and the lower cell portion 49. This arrangement provides effective and widely accepted noise suppression characteristics. Aircraft engines with reduced noise signatures are mandated by government authorities, and often are specified by aircraft manufacturers, airlines and local communities.

U.S. patent application Ser. Nos. 11/276,344 and 11/733,628 (incorporated herein by reference in their entirety), describe graphite fabric heater elements embedded within the layers of a composite structure such as a nacelle inlet lip. The described composite structure includes a heater element integrally formed within a composite aircraft structure having a leading edge. The composite structure includes an open cell core, and a plurality of composite layers atop the core. The composite layers include perforations that extend through the composite layers (including the heater element layer) to the underlying open cell core. The graphite fabric heater elements can include a plurality of interwoven threads containing electrically conductive graphite fibers. Such a structure provides both ice protection and noise attenuation.

Figure 2:
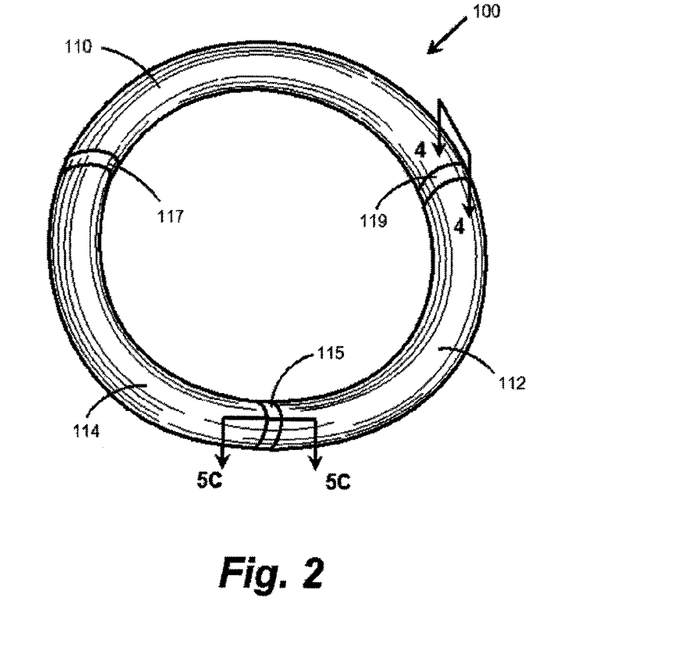
FIG. 2 is a front perspective view of a nacelle inlet lip formed in three segments.
Figure 3:
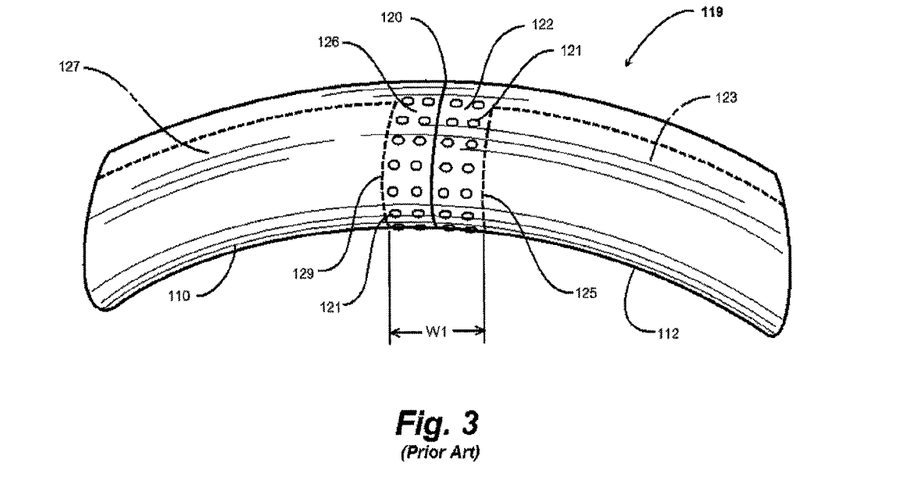
FIG. 3 is a front perspective view of a conventional back-spliced joint between adjoined inlet lip segments.

As shown in FIG. 2, a typical nacelle inlet lip 100 can be formed in two or more circumferentially extending lip sections 110, 112, 114 that are joined end-to-end. The sections 110, 112, 114 can be connected at spliced joints 115, 117, 119. A detail of one typical prior art spliced joint 119 between the ends of two inlet lip segments 110, 112 is shown in FIG. 3. In this arrangement, the segments 110, 112 meet along a space 120, which usually includes a narrow gap between the opposed ends of the segments 110, 112. One end 126 of a first segment 110 is connected to an adjacent end 122 of a second segment 112 by a plurality of fasteners 121 that extend through the segments 110, 112 and connect to a backing plate or splice plate (not shown in FIG. 3) that spans rear portions of the adjoined ends 122, 126 of the segments 110, 112 and the gap 120 therebetween, thus securing the ends 122, 126 in end-to-end relationship. As shown by dashed lines in FIG. 3, when the leading edges of the segments 110, 112 are provided with integral electrically powered ice protection heaters 123, 127, the ends 125, 129 of the heaters nearest the gap 120 are spaced apart by a circumferential distance W1. The spacing W1 is necessary in order that the metal fasteners 121 do not extend through or contact the electric heater elements 123, 127.

Figure 4A:
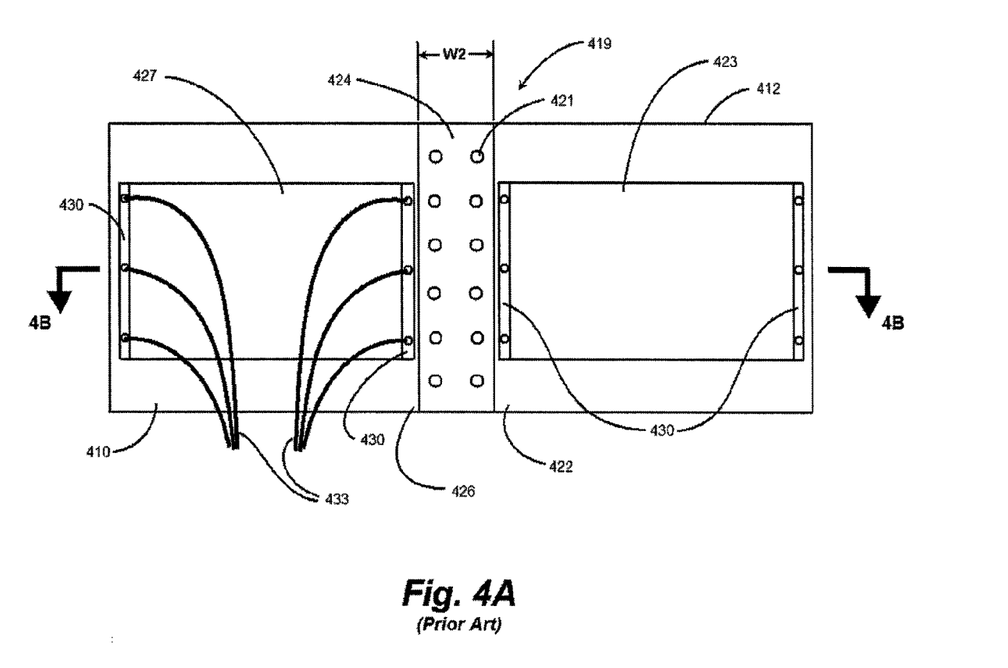
FIG. 4A is a front elevation view of a conventional front-spliced joint between adjoined inlet lip segments.
Figure 4B:
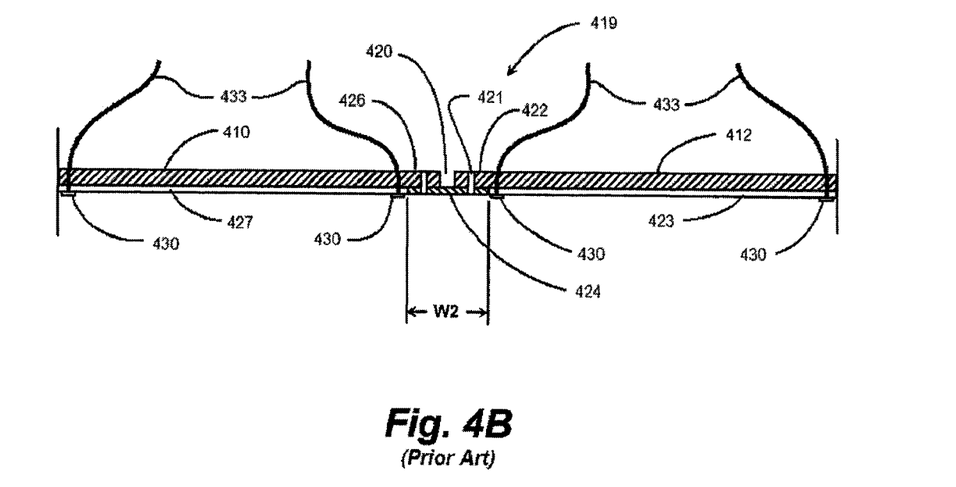
FIG. 4B is a cross-sectional view of the front-spliced joint shown in FIG. 4A taken along line 4B-4B in FIG. 4A.

Another typical prior art spliced joint 419 between two adjoined inlet lip segments 410, 412 is shown in FIGS. 4A and 4B. In this arrangement, a splice plate 424 is positioned on adjacent exterior faces of the segment ends 422, 426, and across a gap 420 therebetween. A plurality of fasteners 421 extend through the splice plate 424 and the segment ends 422, 426, thus securing the ends 422, 426 together in end-to-end relationship. As shown in FIGS. 4A and 4B, integral electric heater elements 423, 427 can include a plurality of spaced electrically conductive bus strips 430 for use in establishing an electric potential across the heater elements 423, 427. As also shown in FIGS. 4A and 4B, the bus strips 430 can be connected to a voltage source by wires 433 that extend through the back sides of the inlet lip segments 410, 412. Like the back-splice arrangement discussed above, the edges of heater elements 423, 427 that are nearest the gap 420 are necessarily spaced apart by a circumferential distance W2 such that none of the metal fasteners 421 penetrate the heater elements 423, 427 or the bus strips 430.

In some circumstances, the exterior surfaces of the inlet lip segments 110, 112 associated with the gaps W1 and W2 shown in FIGS. 3-4B may not be sufficiently heated by the nearest heater elements 123, 127 to prevent ice formation or to melt accumulated ice. Accordingly, these unheated gaps W1, W2 can result in "cold spots" at the gaps 120 between adjoined inlet lip segments. As discussed above, ice accumulation on the surfaces of an aircraft's leading edges is undesirable, particularly on the leading edge of an aircraft engine nacelle. In addition, the spliced joints described above can substantially prevent effective acoustic treatment of the portions of the inlet lip segments associated with the gaps W1, W2 because connecting hardware such splice plates, mechanical fasteners, and the like, can at least partially block acoustic perforations in the outer skin and/or the cells of an underlying cellular core, or otherwise interfere with optimal performance of the acoustic liner 40.

Accordingly, there is a need for an ice protection system for an aircraft component's leading edge that includes heating elements that cover substantially the entire extent of the aircraft component's leading edge surface, including those portions of the component that are immediately adjacent to a structural joint between adjacent component segments. In addition, there is a need for such a system that also includes acoustic treatment of substantially the entire extent of the aircraft component's leading edge surface, including those portions of the component that are immediately adjacent to a structural joint between adjacent component segments.

SUMMARY

In one embodiment, an aircraft component can include a first segment having a first leading edge surface that extends to a first end of the first segment. The aircraft component can further include a second segment having a second leading edge surface that extends to a second end of the second segment. The second end can be substantially adjacent to the first end of the first segment. The first leading edge surface can include one or more electrical resistance heating elements that extend to the first end of the first segment, and the second leading edge surface can include one or more electrical resistance heating elements that extend to the second end of the second segment, thus providing electric heating immediately adjacent each side of a juncture between the first and second ends.

In another embodiment, a method of joining first and second aircraft components to form a leading edge of an aircraft surface can include providing a first component having a first exterior surface, a first end, and a first ice protection heater element immediately adjacent the first end. The method further can include providing a second component having a second exterior surface, a second end, and a second ice protection heater element immediately adjacent the second end. The first end of the first component can be joined to the second end of the second component such that the first and second exterior surfaces combine to form a substantially continuous and selectively heatable leading edge surface along a juncture between the first and second ends.

In a further embodiment, an ice protection heater for a leading edge of an aircraft component can include at least two segments joined end to end. The heater can include at least one substantially continuous conductive sheet having a heater portion and a first edge portion, wherein the heater portion and first edge portion intersect at an angle, such as at a right angle. At least a first bus strip can be connected to the first edge portion for supplying electric power to the ice protection heater.

In an additional embodiment, an aircraft component can include a first segment having a first exterior surface, a first end, and a first electric heater element having a first edge proximate to the first end. The aircraft component can further include a second segment having a second exterior surface, a second end, and a second electric heater element having a second edge proximate to the second end. The second end can be configured to be joined to the first end such that the first external surface and the second external surface combine to form at least a portion of a substantially continuous leading edge surface. A first bus bar can be connected to the first edge of the first heater element, and a second bus bar can be connected to the second edge of the second heater element. The first and second bus bars can be disposed between the first end and the second end when the first end is joined to the second end.

These and other aspects and features of the invention will be understood from a reading of the following detailed description together with the drawings.

DETAILED DESCRIPTION

Figure 5A:
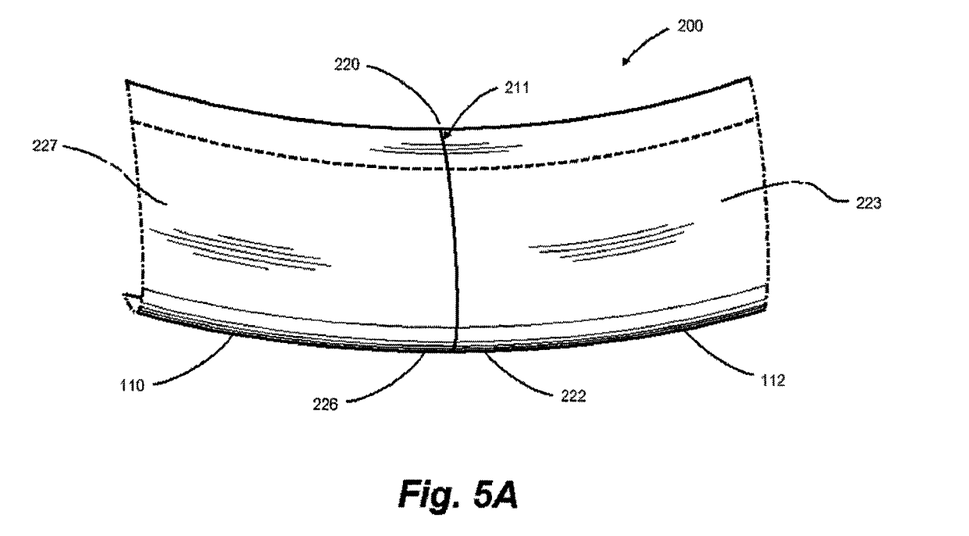
FIG. 5A is a front perspective view of a joint between two ends of adjacent inlet segments with ice protection according to the invention.
Figure 5B:
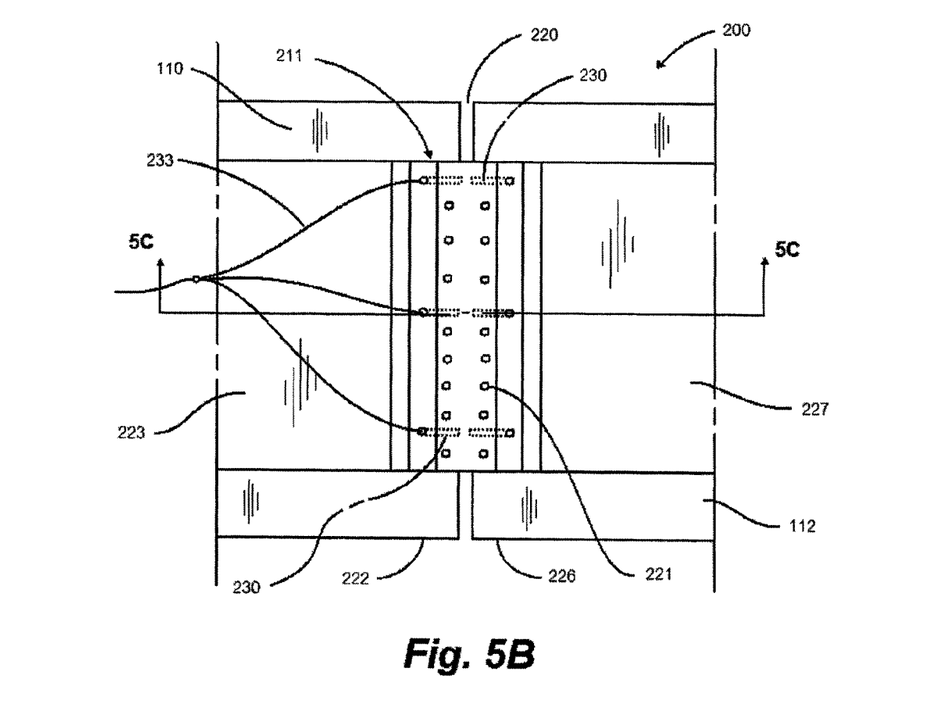
FIG. 5B is a rear elevation view of the joint between two ends of adjacent inlet segments with ice protection as shown in FIG. 5A.
Figure 5C:
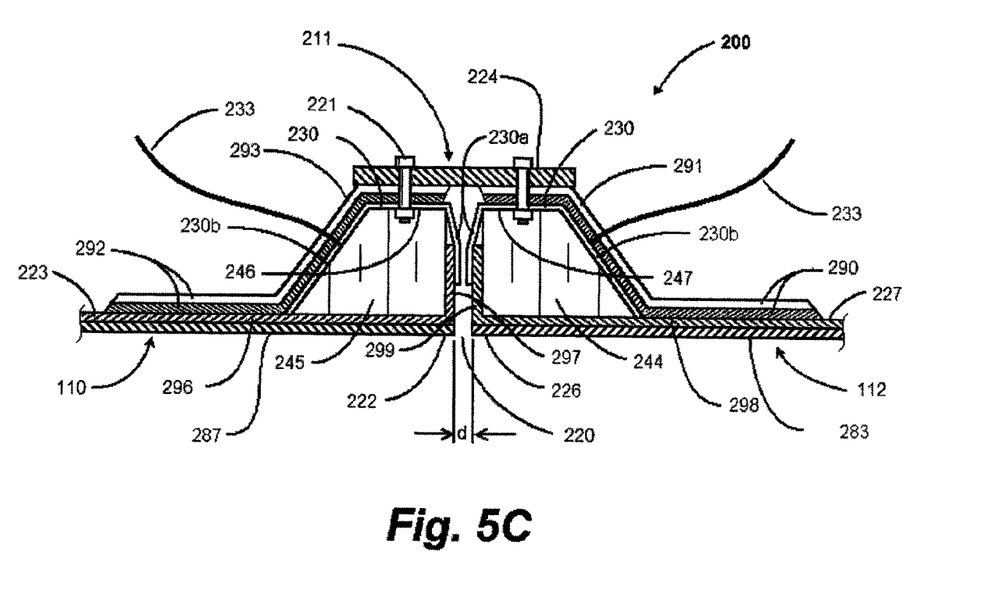
FIG. 5C is a cross sectional view of the joint between two ends of adjacent nacelle inlet lip segments with ice protection as shown in FIGS. 5A and 5B, taken along line 5C-5C in FIGS. 2 and line 5C-5C in FIG. 5B.

FIGS. 5A-5C show one embodiment of an ice protection heater system according to the invention as applied to a multi-segment nacelle inlet lip 200, for example. As shown in FIG. 5A, a nacelle inlet lip 200 includes a first inlet lip segment 110 having a first end 226 joined to a second end 222 of a second inlet lip segment 112 along a joint 211. The joint 211 can include a narrow gap 220 between the segment ends 222, 226. The first inlet lip segment 110 can include a first embedded heating element 227 adjacent to the first end 226, and the second inlet lip segment 112 can include a second embedded heating element 223 adjacent to the second end 222. As shown in FIG. 5A, the joined inlet lip segments 110, 112 can form a substantially continuous exterior surface in the region immediately adjacent to the joint 211 and gap 220. FIGS. 5B and 5C show details of one embodiment of the joint 211.

As shown in FIGS. 5B and 5C, the first end 222 of the first inlet lip segment 110 can include an outermost layer 287, a heater element layer 223, a cellular core 245, one or more bus strips 230, and one or more first backing layers 292. The core 245 can be a metallic or non-metallic honeycomb structure, for example. In the embodiment shown in FIGS. 5B and 5C, the core 245 and the backing layers 292 combine to form a rearwardly extending first flange 293. Similarly, the second end 226 of the second inlet lip segment 112 can include a second outermost layer 283, a second heater element layer 227, a second cellular core 244, one or more bus strips 230, and one or more second backing layers 290. Also similarly, the second core 244 and second backing layers can combine to form a rearwardly extending second flange 291. The various cores and layers can be bonded together within each inlet lip segment 110, 112 to form a unitary structure using known composite materials and composite forming and bonding techniques. One or more additional outermost or backing layers can be provided for additional strength, to provide electrical insulation between electrically conductive portions of the structure, or for any other purpose. The respective thicknesses of the various layers shown in FIG. 5C are exaggerated for purposes of illustration.

The first and second flanges 293, 291 on rear portions of the ends 222, 226 of the inlet lip segments strengthen and stiffen the segments 110, 112, particularly at their ends 222, 226. As shown in FIG. 5C, a splice plate 224 can extend between the flanges 293, 291, and across the interstitial gap 220 therebetween. In FIGS. 5B and 5C, the width of the interstitial gap 220 is exaggerated for illustration purposes. Preferably, the gap 220 is not larger than about 0.1 inch, and preferably, not larger than about 0.06 inch. In one embodiment, the gap 220 can have a nominal width of about 0.03 inch. The splice plate 224 can be connected to each flange 293, 291 by a plurality of removable mechanical fasteners 221, such as by a plurality of blind rivets, or the like. As shown in FIG. 5C, the fasteners 221 can extend through the splice plate 224, through the backing layers 292, 290, and through the back skins 246, 247 on the cellular cores 245, 244, thus securely connecting the ends 222, 226 of the inlet lip segments 110, 112 together. As also shown in FIG. 5C, because the splice plate 224, backing layers 292, 290, and back skins 246, 247 are positioned behind and away from the heating elements 223, 227, the fasteners 221 can be arranged such that none of the fasteners 221 penetrates or contacts any portion of the electrically conductive heating elements 223, 227. As shown in FIG. 5B, the bus strips 230 can be positioned between the fasteners 221, such that the fasteners 221 also do not penetrate or contact any portion of the electrically conductive bus strips 230. The bus strips 230 can be connected to an aircraft electric power supply, such as one or more batteries, an aircraft engine, an auxiliary power unit (APU), or a combination thereof.

As shown in FIG. 5C, the first heating element 223 can include a first leading edge portion 296, and a first recessed portion 297. In this embodiment, the first leading edge portion 296 and the first recessed portion 297 can be substantially orthogonal to each other, though the heater portions 296, 297 also can be configured at other angular orientations. Similarly, the second heating element 227 can include a second leading edge portion 298, and a second recessed portion 299. In this embodiment, the second leading edge portion 298 and the second recessed portion 299 also can be substantially orthogonal to each other, though the heater portions 298, 299 also can be configured at other angular configurations. Because the recessed portions 297, 299 of the heating elements 223, 227 extend into the interstitial gap 220 between the segments 110, 112, the adjoined leading edge portions 296, 298 of the heating elements 223, 227 can extend to the edges of the gap 220. Each of the heating elements 223, 227 generally extends along at least a portion of an outer face of an inlet lip segment 110, 112, and further extends around a corner of an inlet lip segment 110, 112, such that a portion of each heater element 223, 227 extends along an edge surface of a segment 110, 112. Each of the bus strips 230 can include a front end 230a that is in contact with one of the recessed portions 297, 299 of the heating elements 223, 227 within the gap 220, and an opposed rear end 230b that is positioned away from the gap 220 and the splice plate 224, thereby permitting connection to an electrical power source. As shown in FIG. 5C, wires 233 or another electrical supply means can be connected to the rear ends 230b of the bus strips 230 for applying voltages across the heating elements 223, 227. The bus strips 230 can be covered by an electrically insulating coating, or another insulating material. As shown in FIG. 5C, the heating elements 223, 227 extend to the opposed edges of the gap 220, and the recessed portions 297, 299 extend into the gap 220. Accordingly, when electric power is supplied to the heating elements 223, 227, the heat generated by the heating elements 223, 227 can effectively prevent and/or eliminate ice formation within the gap 220 and at and along the adjoined ends 222, 226 of the inlet lip segments 110, 112.

Figure 7:
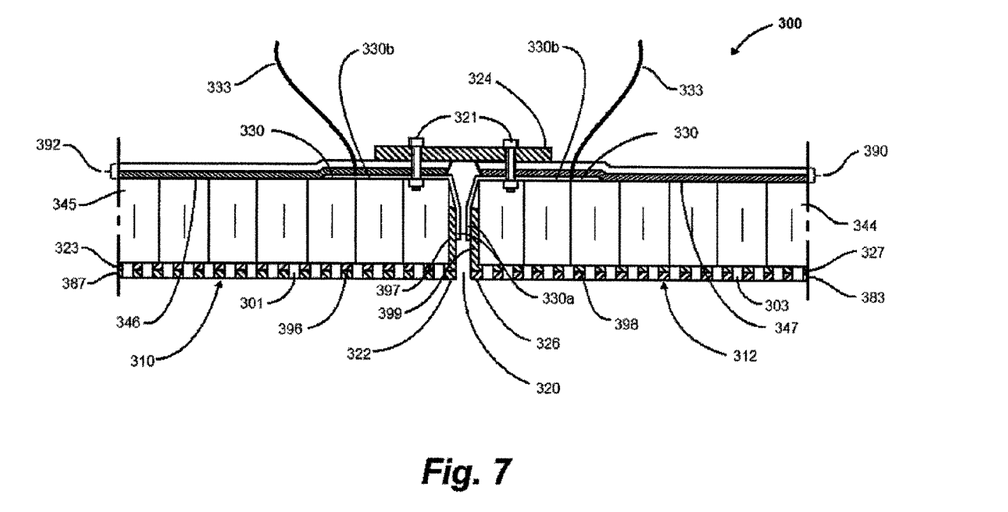
FIG. 7 is a cross-sectional view of an inlet lip joint according to the invention showing inlet lip segments with both ice protection and acoustic treatment.

FIG. 7 shows one alternative embodiment of the invention. In this embodiment, an ice protection heater system according to the invention again is applied to a multi-segment nacelle inlet lip 300. As shown in FIG. 7, a nacelle inlet lip 300 includes a first inlet lip segment 310 having a first end 322 joined to a second inlet lip segment 312 at its second end 326. A narrow gap 320 may exist between the segment ends 322, 326. As shown in FIG. 7, the first inlet lip segment 310 can include a first embedded heating element 323 that is adjacent to the first end 322,. and the second inlet lip segment 312 can include a second embedded heating element 327 that is adjacent to the second end 326.

The first end 322 of the first inlet lip segment 310 can include at least one first outermost layer 387, a first heater element layer 323, a first cellular core 345, one or more bus strips 330, and one or more first backing layers 392. Similarly, the second end 326 of the second inlet lip segment 312 can include at least one second outermost layer 383, a second heater element layer 327, a second cellular core 344, one or more bus strips 330, and one or more second backing layers 390. The cores and layers of each inlet lip segment 310, 312 can be bonded together to form a unitary structure using known composite materials and composite forming and bonding techniques. As discussed in more detail below, the outermost layers 387, 383 and heater elements 323, 327 can be perforated.

As shown in FIG. 7, a splice plate 324 can extend between the first and second ends 322, 326 and across the interstitial gap 320 therebetween. In FIG. 7, the width of the interstitial gap 320 is exaggerated for ease of illustration. Preferably, the gap 320 is not larger than about 0.1 inch, and preferably is not larger than about 0.06 inch. In one embodiment, the gap 320 has a nominal width of about 0.03 inch. The splice plate 324 can be connected to an interior portion of each of the first and second ends 322, 326 by a plurality of mechanical fasteners 321, such as by a plurality of blind rivets, or the like. The fasteners 321 can extend through the splice plate 324, through the backing layers 392, 390, and through the back skins 346, 347 on the cellular cores 345, 344, thus securely connecting the ends 322, 326 of the inlet lip segments 310, 312 together. Like the embodiment shown in FIG. 5C, the fasteners 321 can be arranged such that none of the fasteners penetrates or contacts any portion of the electrically conductive heating elements 323, 327. In addition, the bus strips 330 can be positioned between the fasteners 321 such that none of the fasteners 321 penetrates or contacts any portion of the electrically conductive bus strips 330.

As shown in FIG. 7, the first heating element 323 can include a first leading edge portion 396, and a first recessed portion 397. In this embodiment, the first leading edge portion 396 and the first recessed portion 397 are substantially orthogonal to each other, though the portions 396, 397 can be configured and arranged at substantially any angle. Similarly, the second heating element 327 can include a second leading edge portion 398, and a second recessed portion 399. In this embodiment, the second leading edge portion 398 and the second recessed portion 399 also are substantially orthogonal to each other, though the portions 398, 399 can be configured and arranged at substantially any angle. Because the recessed portions 397, 399 of the heating elements 323, 327 extend within the interstitial gap 320 between the segments 310, 312, the leading edge portions 396, 398 of the heating elements 323, 327 extend to and around the edges of the gap 320. As shown in FIG. 7, each of the bus strips 330 can include a front end portion 330a that is in electrical contact with one of the recessed portions 397, 399 of the heating elements 323, 227, and an opposed rear end portion 330b that extends away from the gap 320 and the splice plate 324. Wires 333 or another electric supply means can be connected to the rear portions 330b of the bus strips 330 for connecting the bus strips 330 to an electric power source. Any exposed portions of the bus strips 330 can be covered by an electrically insulating coating or other insulating material. As shown in FIG. 7, the heating elements 323, 327 extend to the opposed edges of the gap 320, and the recessed portions 397, 399 extend into the gap 320. Accordingly, when electric power is supplied to the heating elements 323, 327, the heat generated by the heating elements 323, 327 can effectively prevent and/or eliminate ice formation within the gap 320 and at and along the adjoined ends 322, 326 of the inlet lip segments 310, 312.

As shown in FIG. 7, a first plurality of openings 301 can extend through the first outer layer(s) 387 and the first heating element layer 323 of the first lip segment 310 to the underlying first cellular core 345. Similarly, a second plurality of openings 303 can extend through the second outer layer(s) 383 and the second heating element layer 327 of the second lip segment 312 to the underlying second cellular core 344. Thus, the first and second pluralities of openings 301, 303 can provide acoustic communication pathways to the open cells of the underlying cores 344, 345. Accordingly, the inlet lip 300 can include both ice protection and acoustic treatment that each extend to the ends 322, 326 of the adjoined segments 310, 312 and to the edges of the gap 320.

The embodiments described above are intended to describe and illustrate various features and aspects of an ice protection system according to the invention. Persons of ordinary skill in the art will recognize that certain changes or modifications can be made to the specifically described embodiments without departing from the invention. For example, though the invention has been specifically described with respect to the leading edges of an aircraft engine nacelle inlet lip, the invention also can be applied to other segmented aircraft components that may be prone to ice formation and accumulation, such as an aircraft's wings, or the like. All such changes and modifications are intended to be within the scope of the appended claims.

What is claimed is:

1. An aircraft component comprising:
    (a) a first segment having a first leading edge surface extending to a first end of the first segment;
    (b) a second segment having a second leading edge surface extending to a second end of the second segment, wherein the second end is substantially adjacent to the first end of the first segment;
    (c) wherein the first leading edge surface includes at least one first electrical heating element that extends at least to the first end of the first segment, and the second leading edge surface includes at least one second electrical heating element that extends at least to the second end of the second segment; and
    (d) wherein at least a portion of each of the first and second electrical heating elements is disposed between the first and second ends of the first and second segments.

2. An aircraft component according to claim 1 wherein the first leading edge surface further includes acoustic treatment extending to the first end of the first segment, and the second leading edge surface further includes acoustic treatment extending to the second end of the second segment.

3. An aircraft component according to claim 1 wherein the first electrical heating element includes a first perforated portion that substantially extends at least to the first end of the first segment, and wherein the second electrical heating element includes a second perforated portion that substantially extends at least to the second end of the second segment.

4. A method of joining first and second aircraft components to form a leading edge of an aircraft surface, the method comprising:
    (a) providing a first component having a first exterior surface, a first end, and a first electric ice protection heater element immediately adjacent the first end;
    (b) providing a second component having a second exterior surface, a second end, and a second electric ice protection heater element immediately adjacent the second end; and
    (c) joining the first end of the first component to the second end of the second component such that the first and second exterior surfaces combine to form a substantially continuous and selectively heatable leading edge surface along a juncture between the first and second ends; wherein at least a portion of each of the first and second electric ice protection heater elements is disposed between the first and second ends of the first and second components.

5. A method according to claim 4 comprising joining the first end to the second end with at least one mechanical fastener.

6. A method according to claim 4 wherein the first and second components comprise portions of an aircraft nacelle.

7. A method according to claim 4 wherein at least the first component is formed from a plurality of bonded composite layers, and wherein the first electric ice protection heater element is disposed between at least two of the bonded composite layers.

8. An aircraft component comprising:
    (a) a first segment comprising a first exterior surface, a first end, and a first electric heater element having a first edge proximate to the first end;
    (b) a second segment comprising a second exterior surface, a second end, and a second electric heater element having a second edge proximate to the second end, wherein the second end is joined to the first end such that the first external surface and the second external surface combine to form at least a portion of a substantially continuous leading edge surface;
    (c) a first bus bar connected to the first edge of the first heater element; and
    (d) a second bus bar connected to the second edge of the second heater element;
    (e) wherein the first and second bus bars are disposed between the first end and the second end when the first end is joined to the second end.

9. An aircraft component according to claim 8 wherein the first and second segments combine to form at least a portion of an aircraft nacelle.

10. An aircraft component according to claim 8 wherein:
    (a) the first segment comprises a first plurality of layers including a first outermost layer, and wherein the first electric heater element is disposed beneath at least the first outermost layer; and
    (b) the second segment comprises a second plurality of layers including a second outermost layer, and wherein the second electric heater element is disposed beneath at least the second outermost layer.

11. An aircraft component according to claim 10 wherein the first and second pluralities of layers comprise bonded composite layers, and wherein the first and second electric heater elements each comprise a graphite layer disposed within the bonded composite layers.

12. An aircraft component according to claim 10 wherein a first open cell core is disposed beneath the first plurality layers, and a second open cell core is disposed beneath the second plurality of layers, and wherein a plurality of perforations extend through the first and second pluralities of layers and the first and second electric heater elements to the first and second open cell cores.

13. An aircraft component according to claim 10 and further comprising a first flange portion on the first end of the first segment, a second flange portion on the second end of the second segment, and at least one fastener at least partially connecting the first flange portion to the second flange portion.

14. An aircraft component according to claim 8 wherein the first and second electric heater elements are configured to selectively heat portions of the substantially continuous leading edge surface that border a joint between the first and second ends.

15. An aircraft component according to claim 8 wherein the first and second electric heater elements are configured to selectively heat a gap between the first and second ends.

16. An aircraft engine nacelle having a circumferentially extending inlet lip, the inlet lip comprising:
(a) a first circumferentially extending inlet lip section having a first circumferentially extending lip surface and an axially extending first edge surface, and a second circumferentially extending inlet lip section having a second circumferentially extending lip surface and an axially extending second edge surface, the first and second inlet lip sections being arranged such that the first and second edge surfaces are adjacent to each other and define a gap therebetween;
(b) a first heater element embedded in the first inlet lip section and extending along the first lip surface and the first edge surface, and a second heater element embedded in the second inlet lip section and extending along the second lip surface and the second edge surface; and
(c) a splice plate extending across the gap between the first and second edge surfaces, and securing the first and second inlet lip sections together.

17. An aircraft engine nacelle according to claim 16 wherein the first and second inlet lip sections each comprise a honeycomb core.

18. An aircraft engine nacelle according to claim 17 wherein the first and second heater elements each include a plurality of perforations that provide acoustic communication with cells of one of the honeycomb cores.

19. An aircraft engine nacelle according to claim 16 and further including at least one bus strip that extends into the gap between the first and second edge surfaces.

20. An aircraft engine nacelle according to claim 16 wherein the first and second heater elements comprise graphite.

21. An aircraft component comprising:
(a) a first segment having a first leading edge surface extending to a first end of the first segment;
(b) a second segment having a second leading edge surface extending to a second end of the second segment, wherein the second end is substantially adjacent to the first end of the first segment;
(c) wherein the first leading edge surface includes at least one first electrical heating element that extends at least to the first end of the first segment, and the second leading edge surface includes at least one second electrical heating element that extends at least to the second end of the second segment; and
(d) wherein the first end of the first segment and the second end of the second segment are at least partially connected by at least one splice member that extends across a gap between the first end and the second end.

* * * * *